A. C. CROFT.
CULTIVATOR.
APPLICATION FILED JAN. 9, 1920.

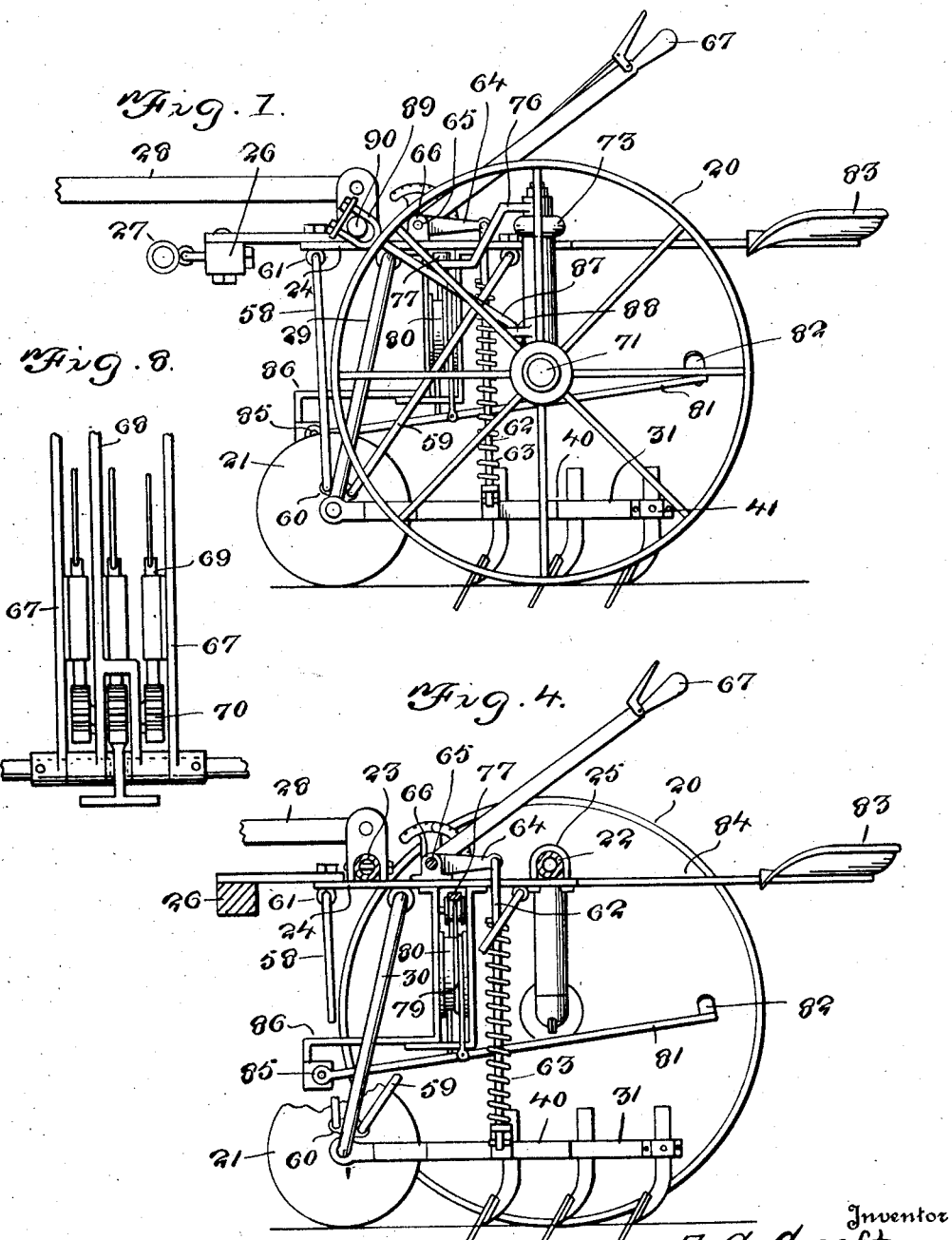

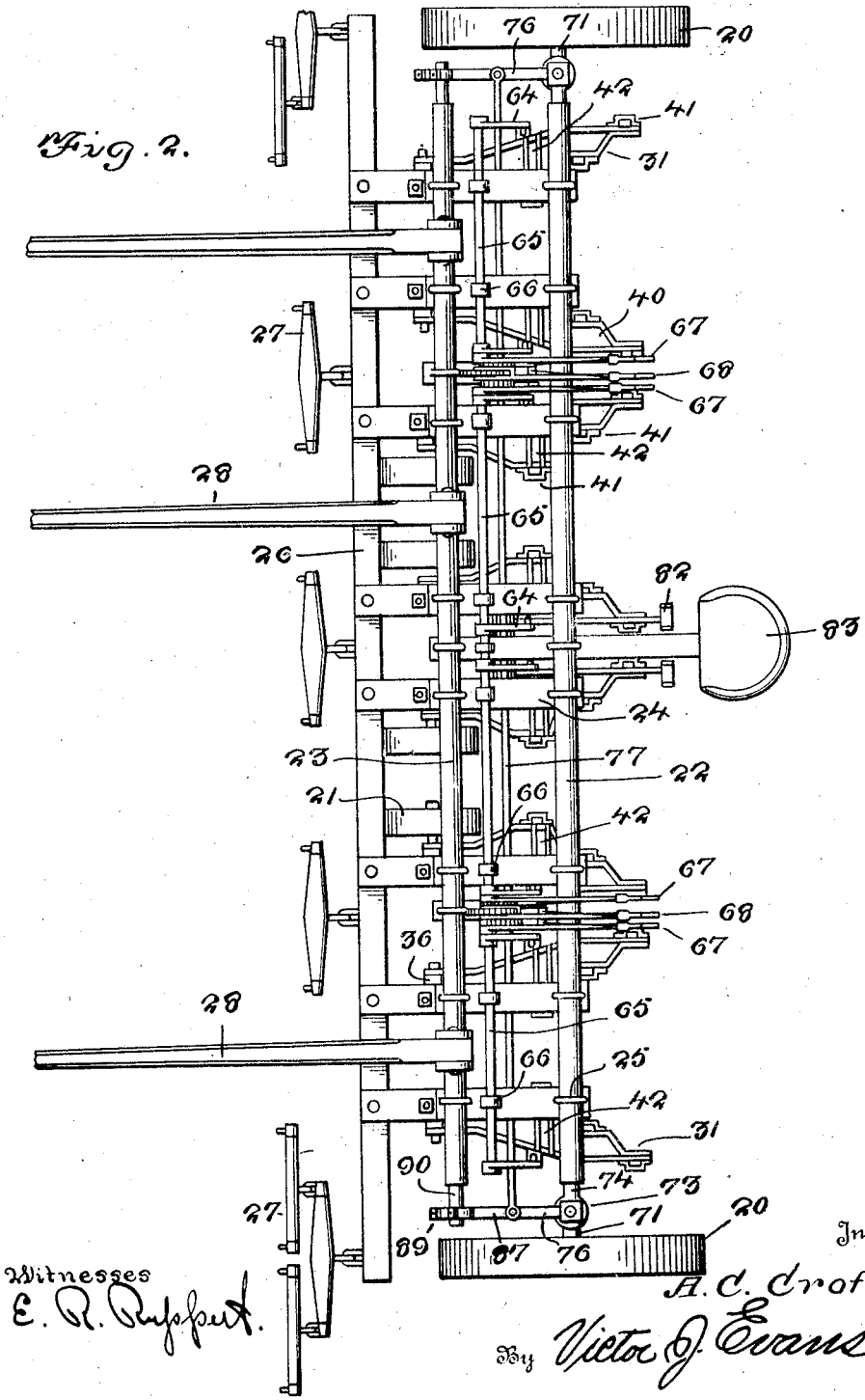

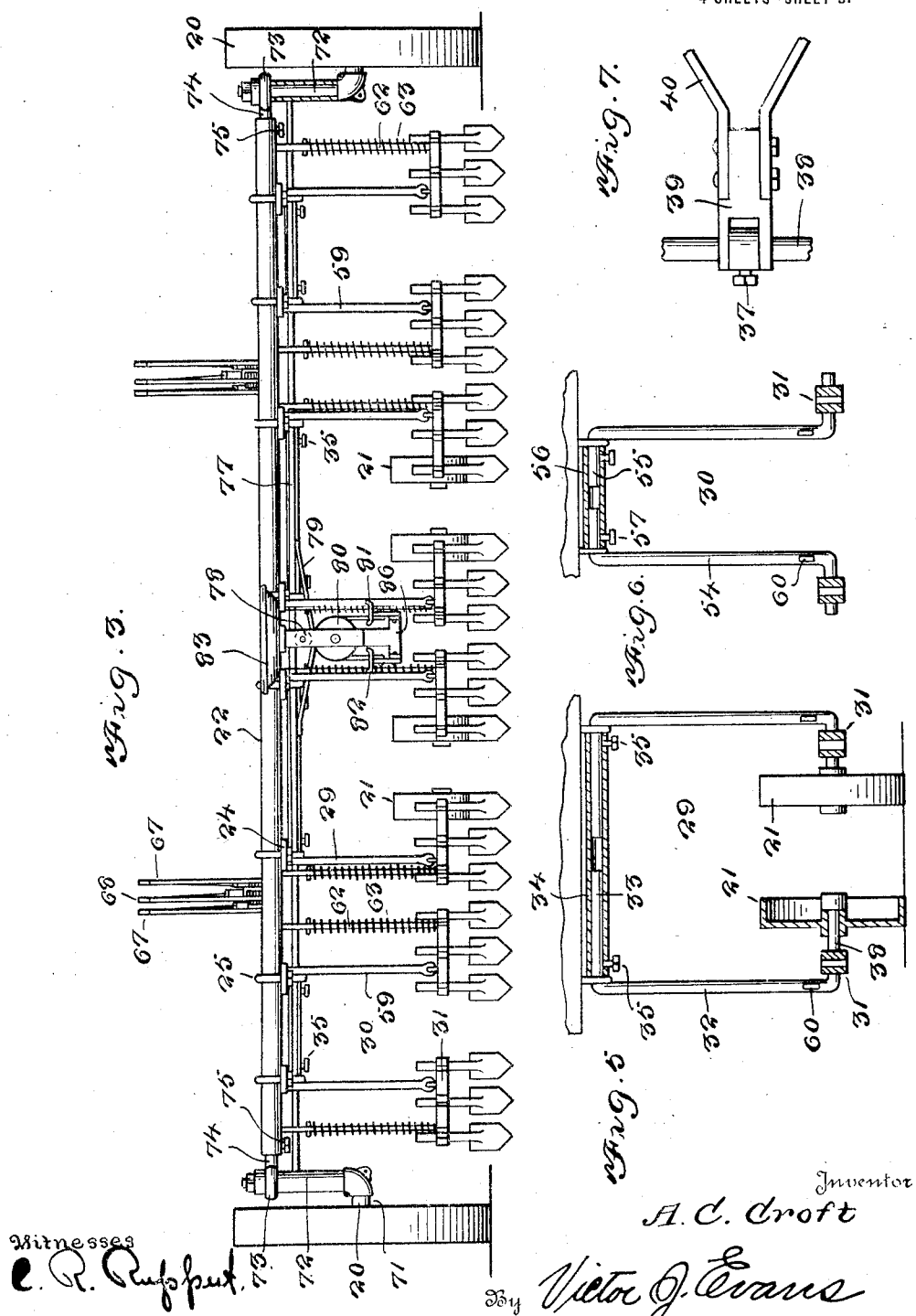

1,357,149.

Patented Oct. 26, 1920.
4 SHEETS—SHEET 4.

Witnesses
E. R. Ruppert

Inventor
A. C. Croft
By Victor J. Evans
Attorney

UNITED STATES PATENT OFFICE.

ANDREW C. CROFT, OF ARMOUR, SOUTH DAKOTA.

CULTIVATOR.

1,357,149.   Specification of Letters Patent.   Patented Oct. 26, 1920.

Application filed January 9, 1920. Serial No. 350,374.

*To all whom it may concern:*

Be it known that I, ANDREW C. CROFT, a citizen of the United States, residing at Armour, in the county of Douglas and State of South Dakota, have invented new and useful Improvements in Cultivators, of which the following is a specification.

The object of the invention is to provide a convertible machine of the cultivator type adapted for a wide range of use in the cultivation of listed or drilled crops such as grain, corn and the like and for the preparation of the soil for planting or subsequent to plowing and suitable for simultaneously treating two, three or four rows with interchangeably applicable bits or cultivating elements such as shovels, disks, or any equivalent thereof, employed separately or jointly as the conditions and preferences of the operator may suggest, and with due regard to the spacing of the rows, the degree of depression of the cultivating element, considered either as a unit or in groups, and the direction of the progress of the machine being under the control of the driver conveniently located to observe conditions in advance thereof; and with these general and other related objects in view as will appear hereinafter, the invention consists in a construction, combination and relation of parts of which a preferred embodiment is illustrated in the accompanying drawings, it being understood that changes in form, proportion, and details may be resorted to, within the scope of the appended claims, without departing from the principles involved.

In the drawings:

Figure 1 is a side view of the machine.

Fig. 2 is a plan view of the same.

Fig. 3 is a rear view.

Fig. 4 is a vertical section taken approximately in the plane of the center of the machine.

Figs. 5 and 6 are detail views of the hanger frames to which the cultivator beams are connected.

Fig. 7 is a detail plan view showing the connection of a cultivator beam to the hanger.

Fig. 8 is a detail view showing the beams whereby the depression of the cultivator beam and hence of the cultivating elements carried thereby are regulated either as unit or in groups to determine the depth of penetration of the cultivator elements.

Figure 9:
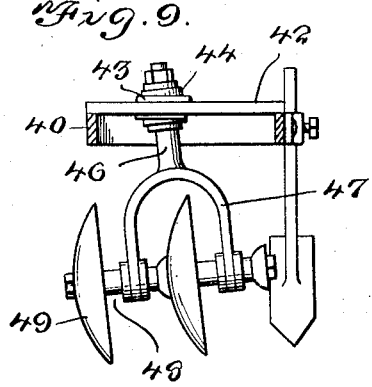
Fig. 9 is a detail view of a plow beam equipment consisting of a combination of disks and a shovel.

In carrying out the primary purpose of this invention to construct a machine suitable for cultivating in one operation a path of one rod or any portion thereof in width it has been found desirable to employ a frame supported by dirigible main wheels 20 and supplemental pilot wheels 21 and consisting essentially of the substantially parallel transverse tubular beams 22 and 23 connected by longitudinally extending straps or bars 24 secured to said beams by U-bolts 25 or the equivalent thereof and extended in front of the tubular member 23 to support the transverse draft beam 26 with which are connected the draft appliances such as the double-trees 27 and over which extend the poles 28 which are secured at their rear ends to the beam 23, it being understood however, that so far as the draft appliances are concerned the illustration is merely typical and may be modified as found desirable in practice.

Supported by the main frame consisting of the above mentioned transverse beams 22 and 23 and the connecting straps or bars 24 are the hanger frames 29 and 30 distributed as indicated throughout the width of the machine and each consisting of a pair of hanger arms adjustable relatively to each other in the direction of the width of the machine and having connected therewith the plow beams 31 which support the soil cultivating elements such as shovels, disks and the like, as hereinafter more particularly set forth. The intermediate hangers 29 have their arms 32 provided with inturned spindle portions 33 fitted in sleeves 34 which are secured to the undersides of the longitudinal straps or bars 24 and secured at the desired adjustment to determine the interval between said arms, by means of set screws 35 or their equivalent, while the inturned lower terminals of said arms serve as the fulcrums for the connected plow beams 31 and journaled for the supplemental pilot wheels 21. Preferably, as shown in detail in Fig. 7 a collar 36 is secured by means of a set screw 37 to the spindle portions represented by the inturned terminal 38 of each hanger arm while a bifurcated connector block 39 is mounted to straddle said collar, and to this block are attached the terminals of the looped plow beam proper which is shown at 40 and which preferably is provided with at least three plow standard seats 41 to the end that three plow shovels may be mounted upon each beam to follow different paths in the progress of the machine, it being understood that the type of shovel may be changed to suit the character of the work to be performed and the direction in which the soil is to be thrown thereby.

Figure 10:
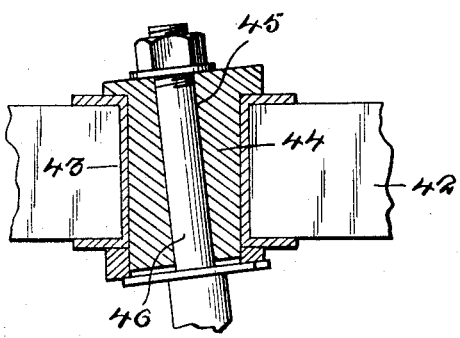
Fig. 10 is a detail sectional view showing the mounting of the stem of the disk carrying yoke.
Figure 11:
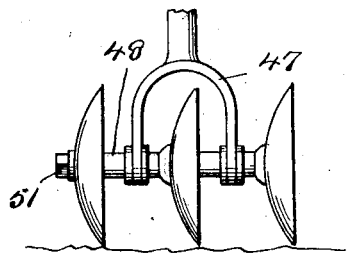
Fig. 11 shows an arrangement including three cultivator disks.
Figure 12:
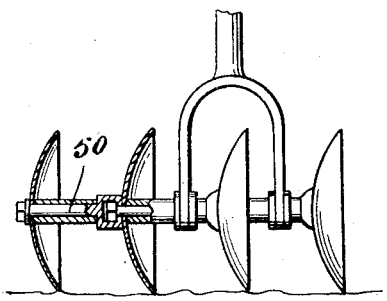
Fig. 12 shows the arrangement of parts for accommodating four cultivator disks.
Figure 13:
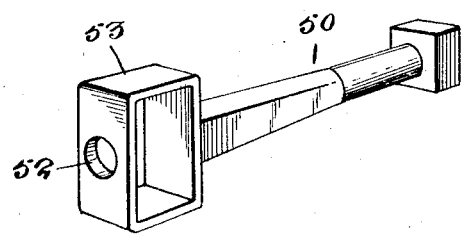
Fig. 13 is a detail view of the extension spindle member used when a fourth cultivator disk is employed in a gang.
Figure 14:
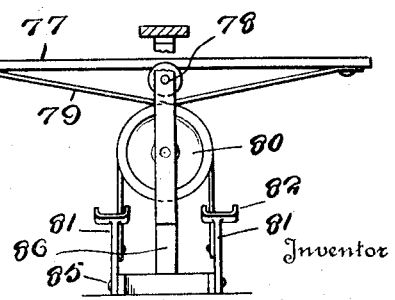
Fig. 14 is a detail view of the means whereby motion is communicated from the foot pedals to the steering bar by which the dirigible ground wheels are connected.

Also the interval between the separated sides of the loop formed by each plow beam is spanned by transverse bars 42 which, as indicated in detail in Figs. 9 and 10 support a flanged sleeve or thimble 43 in which is revolubly fitted a spool 44 of which the bore 45 forms a socket for a stem 46 of the yoke 47 carrying a spindle 48 upon which may be mounted the cultivator disks 49. The bore 45 of the spool is arranged diagonally or at an angle to the axis of the spool so that by varying the adjustment of the spool in the sleeve or thimble, that is by turning the same to a greater or less extent, the angle of the stem of the yoke 47 may be varied in relation to a horizontal plane and the line of progress of the machine so as to correspondingly vary the inclination and position of the disk to the end that the desired action of the latter upon the soil in cultivating or hilling the rows may be adapted to the condition of the grain or corn, and moreover as will be obvious this adjustment of the disk supporting yoke may be effected independently of the standards by which the cultivator shovels are supported to the end that the disks may be used jointly with the shovels as shown in Fig. 9, or a gang of three disks may be supported by the yoke as shown in Fig. 11. When it is desired to cultivate the entire surface of the soil traversed by the machine or in other words to fill the interval between the gangs of cultivator disks, an extension spindle 50 as shown in detail in Fig. 13 may be connected with the spindle 48 by removing the terminal screw 51 of the latter and engaging it with an opening 52 in a stirrup 53 formed on one end of the supplemental or extension spindle as indicated in Fig. 12.

Thus any desired combination of cultivating elements may be employed to suit the condition under which the machine is being employed and the nature and condition of the crop or their speed of development, and obviously the change of the equipment to suit the condition may be effected from time to time without material inconvenience to the operator.

The terminal hangers 30 which correspond in function with the hangers 29 which are specifically described hereinabove, consists of the relatively adjustable arms 54 having spindle portions 55 fitted in sleeves 56 and secured at the desired adjustment by set screw 57, the out-turned terminals of said arms having plow beams connected therewith as previously described, but there being no supplemental or pilot wheels mounted thereon as described with reference to the intermediate hanger arms.

The arms of both sets of hangers however are secured in position by means of fore and aft braces 58 and 59 connected at their lower ends to ears 60 on the arm and at their upper ends to the longitudinal straps or bars 24 by means of the eyes 61 or the equivalent thereof.

The plow beams are yieldingly held depressed to cause the desired penetration of the cultivator elements by means of plunger rods 62 acting through compression springs 63 and connected with crank arms 64 which are carried by rock shaft members 65 mounted in suitable bearings 66 on the longitudinal straps or bars 24 as shown plainly in Fig. 2, each of said rock shaft sections preferably being connected with two plow beams and the adjacent ends of two rock shaft sections being provided with operating levers 67 to provide for the independent operation of said rock shaft sections, while a joint or common operating lever 68 is disposed between the levers 67 and is adapted when operated to correspondingly move both the rock shaft sections to cause the simultaneous adjustment of the plow beams connected with both of said shaft sections. A locking means consisting of a dog 69 and a rack 70 is employed in connection with each of said levers as a means of securing the rock shaft and hence the connected plow beams at the desired adjustment.

In order that the interval between the supporting or ground wheels 20 may be varied to suit the conditions under which the machine is being employed, and also in order to provide for the turning of said wheels to control the direction of progress of the machine, the ground wheel spindles 71 are carried by knuckle arms 72 mounted in bearings 73 in the outer ends of cores 74 fitted in the ends of the tubular cross beams 22 and secured at the desired adjustment by means of set screws 75 or the equivalent thereof. Said knuckle bars carry crank arms 76 connected transversely of the machine by a steering bar 77 which may intermediately be supported by suitable rollers 78 and having connected therewith the flexible runners 79 traversing a drum 80 and connected with the levers 81 of the foot pedals 82 arranged within convenient reach of the seat 83 supported by a rearwardly extending yielding bar 84 supported by the main frame. Obviously, the depression of either of said pedals of which the supporting levers 81 are fulcrumed at 85 upon a suitable bracket 86 depending from the main frame, will turn the drum in one direction or the other and consequently pull the steering bar in a similar direction to dispose the ground wheels at the desired angle. Braces 87 engaged with ears 88 on the knuckle bars 72 extend forward and are provided with yokes 89 which embrace coextensions 90 fitted in the extremities of the forward tubular beam 23.

As will be obvious from the foregoing description, the operating means including the pedals by which the steering of the machine is controlled and the hand levers by which the depression of the cultivating element is regulated are within convenient reach of the driver or operator positioned upon the seat 83 in position to control the draft animals and also to observe the condition of the field in advance of the machine to the end that the cultivation of the soil may be conducted with the most satisfactory results and with great expedition owing to the wide path of the machine.

Having described the invention what is claimed is:—

1. A cultivator having a wheel supported main frame, hanger frames depending from the main frame, plow beams pivotally connected with and led by the hanger frames, and adjustable means for varying the depression of the plow beams, each of said plow beams consisting of a looped frame provided with a plurality of shovel standard seats or sockets and transverse connecting bars carrying bearings, and interchangeable cultivator elements for engagement respectively with said seats and bearings.

2. A cultivator having a wheel supported main frame, hanger frames, plow beams pivotally connected with and led by the hanger frames, and adjustable means for varying the depression of the plow beams, each plow beam consisting of a looped frame carrying interchangeable means for supporting cultivator elements, one of said means consisting of a revolubly mounted spool provided with a diagonally disposed seat, and a disk supporting yoke having its stem mounted in said seat.

3. A cultivator having a wheel supported main frame, hanger frames, plow beams led by the hanger frames, and means for varying the depression of the plow beams, each of said plow beams consisting of a looped frame provided with means for supporting cultivator elements, and one of said means consisting of a sleeve or thimble, a spool revolubly mounted in the sleeve or thimble and provided with a diagonally disposed seat, a yoke having its stem secured in said seat, and a disk supporting spindle carried by the yoke.

4. A cultivator having a wheel supported main frame, hanger frames, plow beams led by the hanger frames, and means for varying the depression of the plow beams, each of said plow beams consisting of a looped frame provided with means for supporting cultivator elements, and one of said means consisting of a sleeve or thimble, a spool revolubly mounted in the sleeve or thimble and provided with a diagonally disposed seat, a yoke having its stem secured in said seat, and a disk supporting spindle carried by the yoke, and consisting of a main spindle section and a spindle extension detachably secured to the main section.

5. A cultivator having a wheel supported main frame, hanger frames, plow beams led by the hanger frames, and means for varying the depression of the plow beams, each of said plow beams consisting of a looped frame provided with means for supporting cultivator elements, one of said means consisting of a sleeve or thimble, a spool revolubly mounted in the sleeve or thimble and provided with a diagonally disposed seat, a yoke having its stem secured in said seat, and a disk supporting spindle carried by the yoke, and consisting of a main spindle section and a spindle extension detachably secured to the main section, and having a terminal eye provided with an opening for engagement by an axial bolt.

In testimony whereof I affix my signature.

ANDREW C. CROFT.